Patented May 31, 1927.

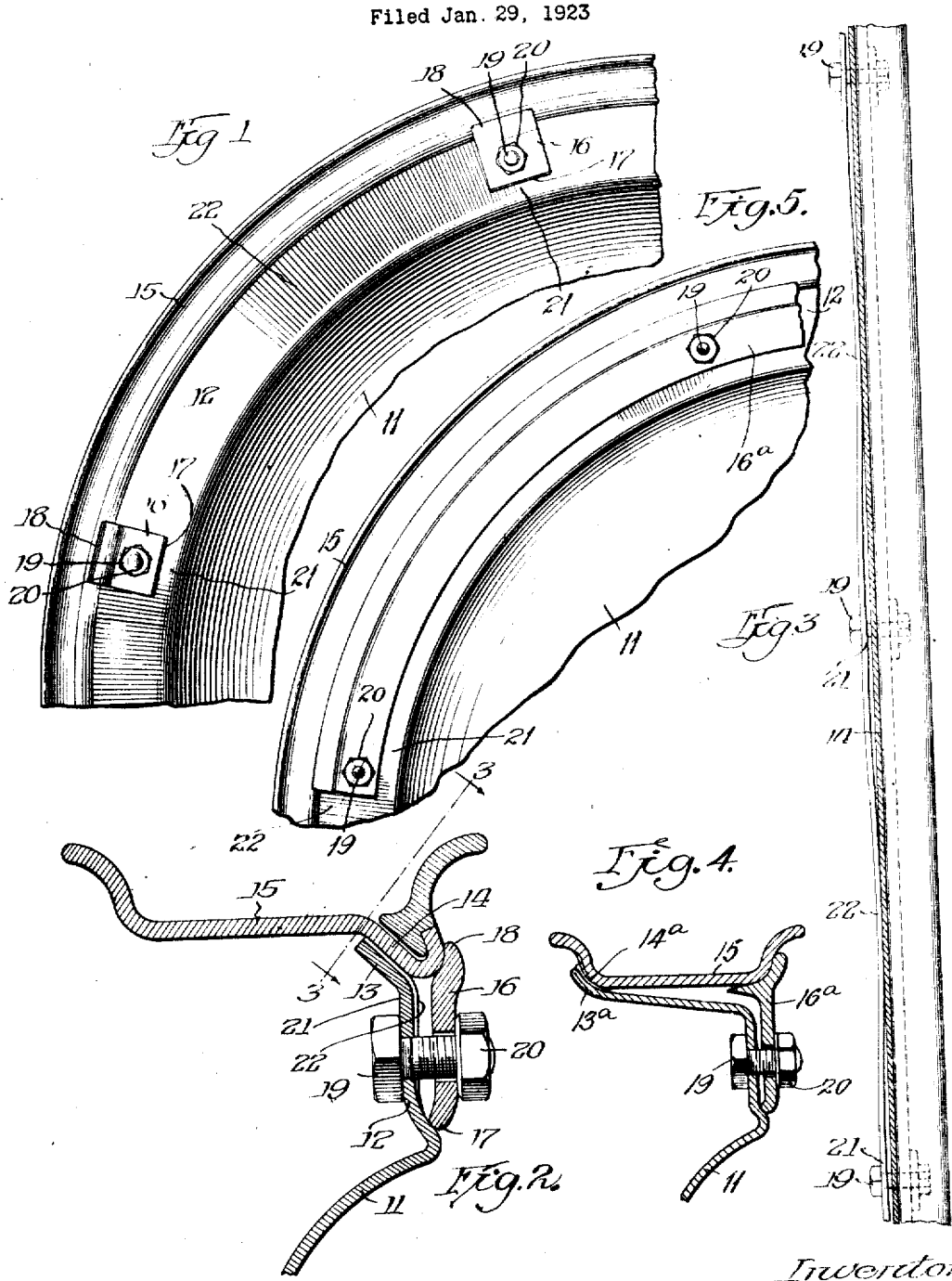

1,630,740

UNITED STATES PATENT OFFICE.

GEORGE H. FORSYTH, OF CHICAGO, ILLINOIS, ASSIGNOR TO MOTOR WHEEL CORPORATION, OF LANSING, MICHIGAN, A CORPORATION OF MICHIGAN.

DISK WHEEL.

Application filed January 29, 1923. Serial No. 615,493.

My invention has to do particularly with the securing of an intimate contact between the rim and disk throughout the peripheral extent of the latter, accompanied with a resilient reaction upon the securing clips and bolts, whereby a firm connection is assured and is maintained unimpaired through an extended period of use.

Where one flat surface is bolted at intervals to a second flat surface and there exist stresses tending to separate the surfaces, as is the case with the abutting faces of a wheel disk and rim, not only do the surfaces between the bolts tend to separate, leaving portions out of contact, but the connections at the bolts are without life and the nuts are apt to work loose under conditions of use.

By my invention I impart to at least one of the contact members, preferably the more flexible disk, a circumferentially wavy or undulate contour, the wave lengths corresponding preferably to the distance between the securing bolts and the crests of the waves corresponding preferably to the location of the bolts, whereby when unstressed the adjacent surfaces of the disk and rim will be in contact between but out of contact at the bolts, and as the bolts are tightened the waves of the disk will be flattened until a continuous line of contact results, in which condition there will be a close fit of the surfaces one against the other with a resilient live reaction at the bolts acting to prevent the working loose of the nuts.

The invention will be readily understood by reference to the accompanying drawing and the following detailed description predicated thereon wherein is set forth a preferred embodiment of the invention. Obviously, however, the invention is susceptible of embodiment in other structural forms wherefore the description and drawing are to be taken in an illustrative and not in an unnecessarily limiting sense. In the drawing—

Fig. 1 is a fragmentary front elevation of a disk wheel embodying the invention;

Fig. 2 is a radial section through that portion of the disk wheel illustrated in Fig. 1;

Fig. 3 is a developed sectional plan taken on the line 3—3 of Fig. 2;

Fig. 4 illustrates in radial section a modified embodiment of the invention, and Fig. 5 is a fragmentary front elevation of a disk wheel embodying the invention including an annulus rim retaining element.

Having particular reference to the drawing the disk 11 is shown as having its peripheral portion extending in a generally radial direction at 12 with its margin 13 disposed at an inclination to the wheel axis and adapted for bearing contact upon a correspondingly inclined portion 14 of a tire-carrying rim 15. A rim-retaining clip, which may be in the form of separate segments 16 or of an annulus 16$^a$, bears at its inner edge 17 upon the disk 11 and at its outer edge 18 upon the forward edge of the rim 15, by means of the clamping action of the bolts 19 and the nuts 20, serves to force the rim rearwardly upon the disk and draw the peripheral portion of the disk forwardly against the rim, the inclined faces of the two at 13 and 14 riding upon each other by a wedge action.

In order to assure a continuous intimate contact between the abutting faces of the parts 13 and 14, the peripheral portion of the disk at its margin 13, and preferably throughout its peripheral portion 12, is given a normally undulate or wavy contour as viewed circumferentially in the plane of the wheel.

The wave lengths of this undulate portion correspond to the distance between the bolts 19, as most clearly shown in Fig. 3 and the crests of the successive waves occur at the bolts, the crests of the waves being indicated at 21 and the troughs of the waves at 22.

It follows that when the rim is first placed upon the disk and the parts remain unstressed the disk periphery at 13 contacts with the rim only at the points 22 corresponding to the troughs of the waves, but as the bolts 19 are drawn home by means of the nuts 20 the waves are flattened until the disk portion 13 at the points 21 corresponding to the crests of the waves also contact with the rim. This is not only insures a close fit of the rim upon the disk at all points about the periphery but also results in a resilient reaction upon the bolts and nuts which tends to prevent the loosening of the latter in use.

While the undulate periphery of the disk is, in the particular embodiment of the drawing, shown as bearing upon the rim adjacent the front of the latter, it will be evident the undulate peripheral margin of a wider disk flange or felly such as is in common use might engage the rim near its rear edge 13ª. It is also evident the undulate contour might be imparted to the contacting surface of either disk or rim, or both, in which latter case a partial nesting of the waves would assist in overcoming any tendency of the rim to creep circumferentially of the disk as shown in Fig. 4.

I claim:

1. A disk wheel having a peripheral portion adapted for bearing contact upon a correspondingly disposed portion of a tire-carrying rim under the influence of spaced clamping means, one of the bearing portions having an undulate contour as viewed circumferentially in the wheel plane.

2. A disk wheel having a peripheral portion adapted for bearing contact upon a correspondingly disposed portion of a tire-carrying rim under the influence of spaced clamping means, the bearing portion of the disk having an undulate contour as viewed circumferentially in the wheel plane.

3. A disk wheel having a peripheral portion adapted for bearing contact upon a correspondingly disposed portion of a tire-carrying rim under the influence of spaced clamping means, the bearing portion of the disk having an undulate contour as viewed circumferentially in the wheel plane and the crests of the undulations corresponding to the location of the clamping means.

4. A disk wheel having a peripheral face of undulate contour as viewed circumferentially, in combination with a tire-carrying rim having a correspondingly disposed plain face for co-operative bearing against the undulate face of the disk, and means for clamping the two faces in pressure contact, the clamping means acting at points corresponding to the crests of the undulations and tending to flatten the same.

5. A disk wheel having a peripheral face disposed at an angle to the wheel axis and of undulate contour as viewed circumferentially, in combination with a tire-carrying rim having a correspondingly disposed plain face for co-operative bearing against the undulate face of the disk, and bolts for clamping the two faces in pressure contact, the bolts acting at points corresponding to the crests of the undulations and tending to flatten the same.

In testimony whereof I have hereunto subscribed my name.

GEORGE H. FORSYTH.

CERTIFICATE OF CORRECTION.

Patent No. 1,630,740.

Granted May 31, 1927, to

GEORGE H. FORSYTH.

It is hereby certified that the above numbered patent was erroneously issued to "Motor Wheel Corporation", whereas said Letters Patent should have been issued to "Steel Wheel Corporation, of Lansing, Michigan, a corporation of Michigan", said corporation being assignee by mesne assignments of the entire interest in said invention, as shown by the records of assignments in this office; and that the said Letters Patent should be read with this correction therein that the same may conform to the record of the case in the Patent Office.

Signed and sealed this 2nd day of August, A. D. 1927.

Seal.

M. J. Moore,
Acting Commissioner of Patents.

is, in the particular embodiment of the drawing, shown as bearing upon the rim adjacent the front of the latter, it will be evident the undulate peripheral margin of a wider disk flange or felly such as is in common use might engage the rim near its rear edge 13ᵃ. It is also evident the undulate contour might be imparted to the contacting surface of either disk or rim, or both, in which latter case a partial nesting of the waves would assist in overcoming any tendency of the rim to creep circumferentially of the disk as shown in Fig. 4.

I claim:

1. A disk wheel having a peripheral portion adapted for bearing contact upon a correspondingly disposed portion of a tire-carrying rim under the influence of spaced clamping means, one of the bearing portions having an undulate contour as viewed circumferentially in the wheel plane.

2. A disk wheel having a peripheral portion adapted for bearing contact upon a correspondingly disposed portion of a tire-carrying rim under the influence of spaced clamping means, the bearing portion of the disk having an undulate contour as viewed circumferentially in the wheel plane.

3. A disk wheel having a peripheral portion adapted for bearing contact upon a correspondingly disposed portion of a tire-carrying rim under the influence of spaced clamping means, the bearing portion of the disk having an undulate contour as viewed circumferentially in the wheel plane and the crests of the undulations corresponding to the location of the clamping means.

4. A disk wheel having a peripheral face of undulate contour as viewed circumferentially, in combination with a tire-carrying rim having a correspondingly disposed plain face for co-operative bearing against the undulate face of the disk, and means for clamping the two faces in pressure contact, the clamping means acting at points corresponding to the crests of the undulations and tending to flatten the same.

5. A disk wheel having a peripheral face disposed at an angle to the wheel axis and of undulate contour as viewed circumferentially, in combination with a tire-carrying rim having a correspondingly disposed plain face for co-operative bearing against the undulate face of the disk, and bolts for clamping the two faces in pressure contact, the bolts acting at points corresponding to the crests of the undulations and tending to flatten the same.

In testimony whereof I have hereunto subscribed my name.

GEORGE H. FORSYTH.

CERTIFICATE OF CORRECTION.

Patent No. 1,630,740.   Granted May 31, 1927, to

GEORGE H. FORSYTH.

It is hereby certified that the above numbered patent was erroneously issued to "Motor Wheel Corporation", whereas said Letters Patent should have been issued to "Steel Wheel Corporation, of Lansing, Michigan, a corporation of Michigan", said corporation being assignee by mesne assignments of the entire interest in said invention, as shown by the records of assignments in this office; and that the said Letters Patent should be read with this correction therein that the same may conform to the record of the case in the Patent Office.

Signed and sealed this 2nd day of August, A. D. 1927.

Seal.

M. J. Moore,
Acting Commissioner of Patents.